(12) United States Patent
Langkabel et al.

(10) Patent No.: US 10,293,740 B2
(45) Date of Patent: May 21, 2019

(54) METHOD FOR THE OPERATION OF A HEADLIGHT AND MOTOR VEHICLE HEADLIGHT

(71) Applicant: GM GLOBAL TECHNOLOGY OPERATIONS LLC, Detroit, MI (US)

(72) Inventors: Frank Langkabel, Rüsselsheim (DE); Rouven Haberkorn, Darmstadt (DE); Philipp Roeckl, Aschaffenburg (DE); Thomas Feid, Mannheim (DE); Justus Illium, Mainz (DE); Michael Rabe, Heidesheim (DE); Ingolf Schneider, Rüsselsheim (DE); Isabell Woelfelschneider, Rüsselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 825 days.

(21) Appl. No.: 14/971,323

(22) Filed: Dec. 16, 2015

(65) Prior Publication Data
US 2016/0176333 A1   Jun. 23, 2016

(30) Foreign Application Priority Data
Dec. 18, 2014   (DE) .................. 10 2014 018 995

(51) Int. Cl.
*B60Q 1/12* (2006.01)
*B60Q 1/14* (2006.01)

(52) U.S. Cl.
CPC .............. *B60Q 1/12* (2013.01); *B60Q 1/143* (2013.01); *B60Q 2300/322* (2013.01); *B60Q 2300/40* (2013.01)

(58) Field of Classification Search
CPC ...... B60Q 1/12; B60Q 1/143; B60Q 2300/40; B60Q 2300/322
See application file for complete search history.

(56) References Cited

U.S. PATENT DOCUMENTS

| 6,293,686 | B1 | 9/2001 | Hayami et al. |
| 6,626,565 | B2 | 9/2003 | Ishida |
| 6,796,696 | B2 | 9/2004 | Taniuchi |
| 7,352,148 | B2 | 4/2008 | Hashizume |
| 7,429,918 | B2 * | 9/2008 | Watanabe .............. B60Q 1/085 340/468 |

(Continued)

FOREIGN PATENT DOCUMENTS

| DE | 19544211 A1 | 6/1996 |
| DE | 19907943 A1 | 9/2000 |

(Continued)

OTHER PUBLICATIONS

German Patent Office, German Search Report for German Application No. 102014018995.3, dated Sep. 1, 2015.

(Continued)

*Primary Examiner* — David V Bruce
(74) *Attorney, Agent, or Firm* — Lorenz & Kopf, LLP

(57) ABSTRACT

A motor vehicle headlight and method for operating the headlight is disclosed, wherein the headlight is operated in a main beam mode or in a partial main beam node. A light distribution of the main beam of the headlight is adapted as a function of a course of a road which is being traveled along by the motor vehicle. In addition, a motor vehicle headlight is described.

16 Claims, 2 Drawing Sheets

(56) References Cited

U.S. PATENT DOCUMENTS

| | | |
|---|---|---|
| 8,888,340 B2 | 11/2014 | Lee |
| 9,089,892 B2 | 7/2015 | Bloecher |
| 9,243,773 B2 | 1/2016 | Funk et al. |
| 9,358,918 B2 | 6/2016 | Mochizuki et al. |
| 2002/0036907 A1* | 3/2002 | Kobayashi ............... B60Q 1/12 362/464 |
| 2003/0137849 A1 | 7/2003 | Alden |
| 2014/0334168 A1* | 11/2014 | Ehlgen .................. B60Q 1/085 362/466 |

FOREIGN PATENT DOCUMENTS

| | | |
|---|---|---|
| DE | 19923187 A1 | 11/2000 |
| DE | 10205779 A1 | 10/2003 |
| DE | 202004010950 U1 | 10/2004 |
| DE | 102008062640 A1 | 7/2009 |
| DE | 102010021896 A1 | 12/2011 |
| DE | 102012103319 A1 | 10/2013 |
| DE | 102013108342 A1 | 2/2015 |
| EP | 0902509 A1 | 3/1999 |
| EP | 1234717 A2 | 8/2002 |
| EP | 2075881 A1 | 7/2009 |
| JP | 2014107177 A | 6/2014 |
| WO | 2009074671 A1 | 6/2009 |

OTHER PUBLICATIONS

Great Britain Patent Office, Great Britain Search Report for Great Britain Application No. GB1520181.7 dated May 23, 2016.

* cited by examiner

METHOD FOR THE OPERATION OF A HEADLIGHT AND MOTOR VEHICLE HEADLIGHT

CROSS-REFERENCE TO RELATED APPLICATION

This application claims priority to German Patent Application No. 102014018995.3, filed Dec. 18, 2014, which is incorporated herein by reference in its entirety.

TECHNICAL FIELD

A motor vehicle headlamp and method for the operation thereof operable in a full main beam mode or in a partial main beam mode.

BACKGROUND

Headlights of the type named in the introduction are generally known in the art, and operable in several modes. For example, it is well-known that headlights can be operated in a dimmed beam mode, which has a limited range of coverage, but in return does not dazzle the oncoming traffic. Furthermore, the majority of headlights can also be operated in a main beam mode, in which a further area of coverage is achieved with higher light intensity and with smaller light cone angles. The relatively narrow main beam distributions are intended inter alia to reduce an impeding of the oncoming traffic by dazzling.

In addition, so-called cornering lamps which on cornering alter their illuminating direction in the direction towards the inside of the bend are also known. Thereby, in darkness, a better field of vision is to be achieved in the bend. On the one hand, static cornering lamps are known, which are frequently also designated as bend lights, realized by switching on a separate light function. The reflector of the cornering lamp is fixed and is aligned so that it illuminates the desired area in front of the vehicle. In addition, on the other hand, dynamic cornering lamps are known, which is realized by horizontal pivoting of a dimmed beam about the focus.

Furthermore, it is known to activate cornering lamps as a function of speed, steering angle and yaw rate as input parameters. For this, a control unit of the vehicle electronics is used, which evaluates the input parameters. The control unit then passes the necessary signals on to corresponding actuators.

Furthermore, the development of dazzle-free safety light systems is known. These safety light systems are based on an LED matrix. Here, the main beam is always set to be dazzle-free and is adapted automatically according to the traffic situation. The matrix light operates in cooperation with a forward looking sensor such as a front camera. As soon as the sensor detects oncoming vehicles or vehicles driving ahead, these areas are automatically faded out from the light cone, whilst the surrounding field continues to remain illuminated brightly with main beam.

From DE 199 23 187 C1 in addition a lighting system for a motor vehicle is known, which is designed for producing a bend light adapted to the driving situation. The lighting system includes a plurality of lighting elements arranged immovably on a longitudinal half of the vehicle for the production of different bend light beams, and a control arrangement, which as a function of the driving situation switches the individual lighting elements on or off independently of one another.

The problem therefore arises of indicating a main beam configuration and a method for operating a main beam, which achieves a better and safer illumination than known hitherto under various traffic conditions.

SUMMARY

The light design of this headlight system in accordance with the present disclosures is based on the restrictions which originate from the forward looking sensor. In particular, a front camera has an opening angle of approximately ±16°. When the main beam is therefore greater than ±16°, for example on motorways in the case of an overtaking maneuver, the overtaking vehicle can be dazzled by reflections of his own light in an exterior mirror of the vehicle which is being overtaken. This would lead to a spontaneous deactivation of the light in this region, which could confuse the driver of a corresponding motor vehicle. The main beam distribution must therefore be adapted to the corresponding camera characteristic. This requires restrictions in the design of the corresponding main beam.

A method for the operation of a headlight of a motor vehicle makes provision that the headlight is operated in a main beam mode or in a partial main beam mode. Such a main beam mode is distinguished in that it has a more far-reaching light distribution than a dimmed beam, whereby it permits a better long-distance vision for a driver of the motor vehicle. A partial main beam mode can be a dazzle-free main beam of the type mentioned in the introduction.

Provision is made here that a light distribution of the main beam of the headlight is adapted as a function of a course of a road which is traveled along by the motor vehicle. Through such an adaptation of the main beam as a function of the course of the road, an illumination of the road, which is optimized in this respect, can be achieved in the main beam or respectively partial main beam mode. At the same time, a better illumination of the course of the road can be achieved than hitherto. In addition, the system permits a wider road illumination than hitherto usual in camera-based systems of the type described in the background. The method permits the light cone to be kept narrow on straight roads in conformity with the camera, and on winding roads to adapt it to the course of the road accordingly. This increases the active and the passive road safety.

A first further-developing configuration of the method makes provision that the light distribution of the main beam or partial main beam is altered as a function of a bend lying ahead such that the light distribution is widened in the direction of the inside of the bend. This permits a better illumination of the regions of the route on the inside of the bend. Thereby, in the main beam mode, a better illumination of the route is achieved.

According to a further-developing aspect, provision can be made that the light distribution is narrowed in the direction of the outside of the bend. This permits a reduction of the risk of dazzling on opposite lanes on the outside of the bend.

According to a further aspect of the present method, the light distribution can be adapted in a first stage and in a second stage. In some configurations, further stages, up to an incremental adaptation, can be provided. A provision of at least several stages permits an improved adaptation of the light distribution to different situations and different road courses.

According to a further-developing configuration, for the first stage a first side reflector can be activated and for the second stage, the first side reflector and a second side reflector. Through the selective additional activation of the two side reflectors, each side reflector can cover a particular angle range, so that through both side reflectors together in the second stage a wide light distribution can be achieved as a function of the course of the road. The second side reflector can in some configurations also be used alone as a bend light.

According to a further-developing configuration of the method, the first stage can be activated in the case of bends with a curve radius smaller with respect to a first threshold radius. The second stage is activated in the case of bends with a curve radius smaller with respect to a second threshold radius. The second threshold radius is smaller than the first threshold radius. Thus, the first stage can be activated in the case of bends in a part radii range and the second stage in the case of bends with an even narrower curve radius.

Another aspect of the method which is described here makes provision that in the case of a traffic density greater with respect to a threshold traffic density, a main beam mode is deactivated or is not activated. In this way, a dazzling of the oncoming traffic, or traffic traveling ahead in the same direction, can be prevented. The traffic density can be determined for example by external information or by monitoring systems on hoard the motor vehicle.

According to a further-developing aspect, provision can be made that the headlight is not pivoted. Non-pivotable headlights have the advantage that it is possible to realize the headlight more cost-efficiently and with lower maintenance.

A further-developing aspect of the method makes provision that the headlight is a matrix headlight, pixel headlight or laser headlight. Such headlight systems permit the simple embodiment of the method.

In a further possible embodiment of the method, provision can be made that the course of the road is determined with the aid of a camera and/or by means of map data. A camera can be a forward-directed camera and can record the course of the road lying in front of the motor vehicle. Map data can be taken, for example, from a navigation system present in the motor vehicle, whereby also possible wishes of a driver to turn off the road are able to be determined.

A first independent subject concerns a device for operating a headlight of a motor vehicle with main beam mode activation or a partial main beam mode activation, which adapts a light distribution of the main beam of the headlight as a function of the road course of a road which is being traveled along by the motor vehicle.

In a first possible further development, provision can be made that the light distribution of the main beam is altered as a function of a bend lying ahead such that the light distribution is widened in the direction of the inside of the bend.

In a further possible configuration, provision can be made that the light distribution narrows towards the outside of the bend.

In a further possible configuration, provision can be made that the light distribution is adapted in a first stage and in a second stage.

According to another further-developing aspect, the first stage can be formed as a first side reflector and the second stage as a second side reflector, wherein the first stage is activated by the first side reflector and the second stage is activated by the first side reflector and of the second side reflector.

A further-developing configuration of the device makes provision that a curve radius detection is provided, wherein adaption of the light distribution are constructed to activate the first stage in the case of a curve radius which is smaller with respect to a first threshold radius, and to activate the second stage in the case of a curve radius which is smaller with respect to a second threshold radius, wherein the second threshold radius is smaller than the first threshold radius.

Furthermore, in a configuration, a main beam mode deactivation in the case of a traffic density greater than a threshold traffic density. The traffic density can be determined, for example, by local traffic communication which can communicate with other motor vehicles situated in the vicinity, or other means for detecting a traffic density.

In particular, the headlight can be constructed so as to be fixed. Furthermore, the headlight can be a matrix headlight, pixel headlight or laser headlight.

According to a further-developing aspect, provision can be made that a camera and/or map data are available from which the course of the road is determined.

A further independent subject concerns a motor vehicle headlight which has a main beam and a controller. The controller is configured to adapt a light distribution of the main beam as a function of a road course of a road which is being traveled along by the motor vehicle. The motor vehicle headlight is arranged so as to be fixed. A corresponding motor vehicle headlight permits better illumination of a road as a function of the course of the road with a main beam with, at the same time, little maintenance effort and little liability to malfunction.

A first further-developing configuration of the motor vehicle headlight makes provision that the controller is connected with a camera system which is aimed generally in the direction of travel. The camera system may include a camera alone or a camera and a processing unit so that it is possible to evaluate the camera image and derive a road course therefrom.

According to a further-developing aspect, the controller can be designed to receive map data of a road which is to be traveled along. Such a source for map data can be, for example, a navigation system to which the controller is connected.

A further-developing aspect of the motor vehicle headlight can make provision that the controller is designed to receive information regarding the traffic density of the road which is to be traveled along. The traffic density can be received, for example, through vehicle-to-vehicle communication means or corresponding sensors, for example cameras and/or radar sensors. Therefore, in the case of traffic density which is too high, a deactivation of the main beam or activation of a partial main beam can be enabled.

According to a further-developing configuration, the motor vehicle headlight can be a matrix headlight, pixel headlight or laser headlight. These types of headlight permit a modulation of the light distributions with little effort.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
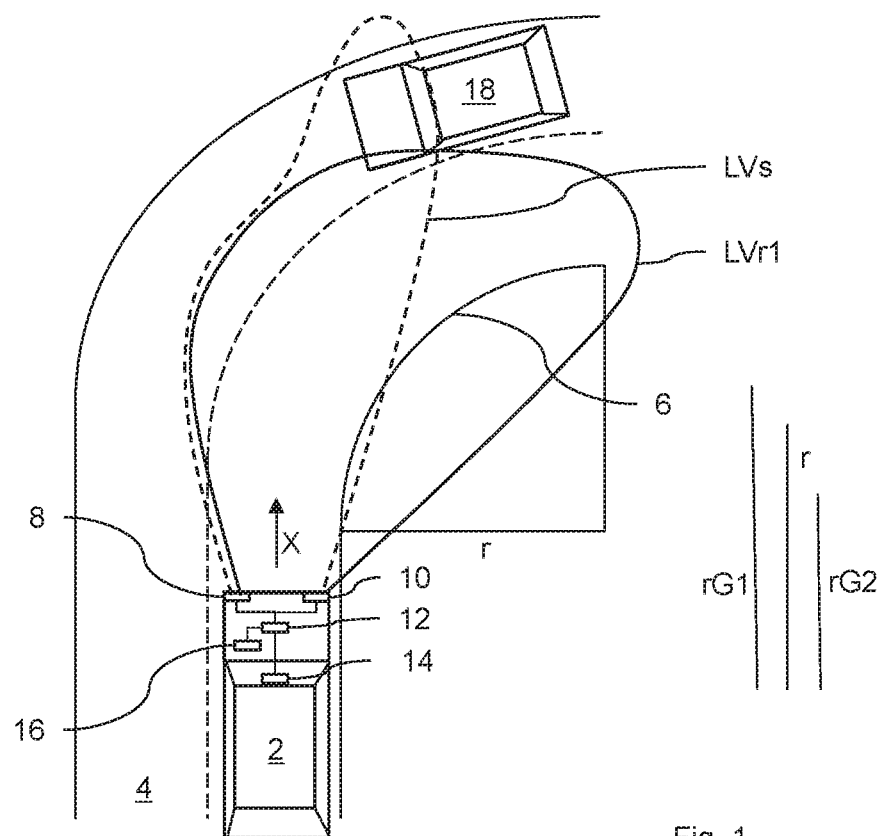
FIG. 1 is atop view onto a motor vehicle.

FIG. 1 shows a top view onto a motor vehicle 2 on a road 4. The motor vehicle 2 is traveling in the direction of travel X. In this direction, a right-hand bend 6 lies ahead in the direction of travel. The right-hand bend 6 has a curve radius R, which has a curve radius smaller with respect to a threshold curve radius rG1 but greater with respect to a smaller threshold curve radius rG2.

The motor vehicle 2 has two front headlights 8, 10. The front headlights 8, 10 are matrix headlights. The headlights 8, 10 are connected with a controller 12, which controls the light distribution of the headlights 8, 10. Thus, several light distributions are able to be adjusted, two of which are illustrated here, and a standard main beam distribution LVs and a right-hand bend main beam distribution of a first stage LVr1. Further light distributions are possible, for example a wider cornering light distribution for narrower bends, which is not illustrated.

The controller 12 is connected furthermore with a camera 14, which monitors an area in front of the motor vehicle 2 in the direction of travel X. Furthermore, a navigation system 16 is provided, which is connected with the controller 12. By means of the navigation system 16, information regarding the subsequent road course of the road 6 can be conveyed to the controller 12. The road course of the road 6 can also be determined via the camera 14 in some configurations.

A further motor vehicle 18, which is coming towards the motor vehicle 2, is situated in the bend 6. The motor vehicle 18 is detected by the camera 14 and the light distribution of the headlights 8, 10 can be adapted thereupon, if the light distribution LVr1 would dazzle the motor vehicle 18. The light distribution is displaced by the controller 12 therefore as a whole in the direction towards the inside of the bend 6.

Figure 2:
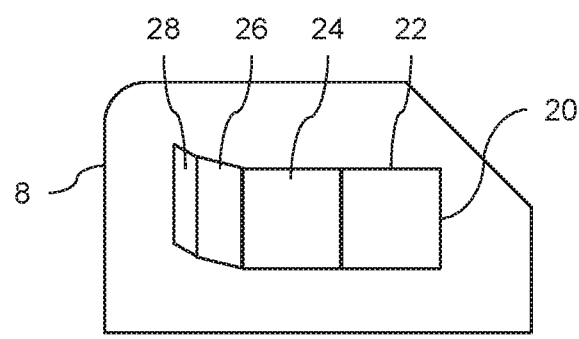
FIG. 2 is a frontal view of a headlight.

FIG. 2 shows a frontal view of the headlight 8. The headlight 8 is equipped as a matrix headlight with a lighting matrix 20. The lighting matrix 20 has various segments. One segment 22 forms a dimmed beam. One segment 24 forms a main beam. Furthermore, a first side reflector segment 26 and a second side reflector 28 are constructed. The first side reflector segment 26 and second side reflector segment 28 are aligned for the illumination of areas laterally to the direction of travel, so that angle ranges between a threshold angle of the main beam 24 and wider angle ranges are able to be illuminated.

Known main beam configurations have an angle range of approximately ±16°, so that for such a main beam the two side reflectors 26, 28 can illuminate ranges of 16° up to a threshold angle. Depending on the configuration, this threshold angle can lie at up to 90°. The threshold between the angle range of the first side reflector 26 and the second side reflector 28 can be made dependent on the configuration, thus the first side reflector 26 can illuminate for example a range up to 40° and the second side reflector 28 the range of 40° to 90°.

By means of the controller 12 for the headlight 8, the light distribution can also be adapted more dynamically and can react to the respective traffic situation, for example by interacting with the camera 14. Thus, individual matrix elements of the lighting matrix 20 can be activated and deactivated in a targeted manner, in order to achieve the appropriate light distribution.

Figure 3:
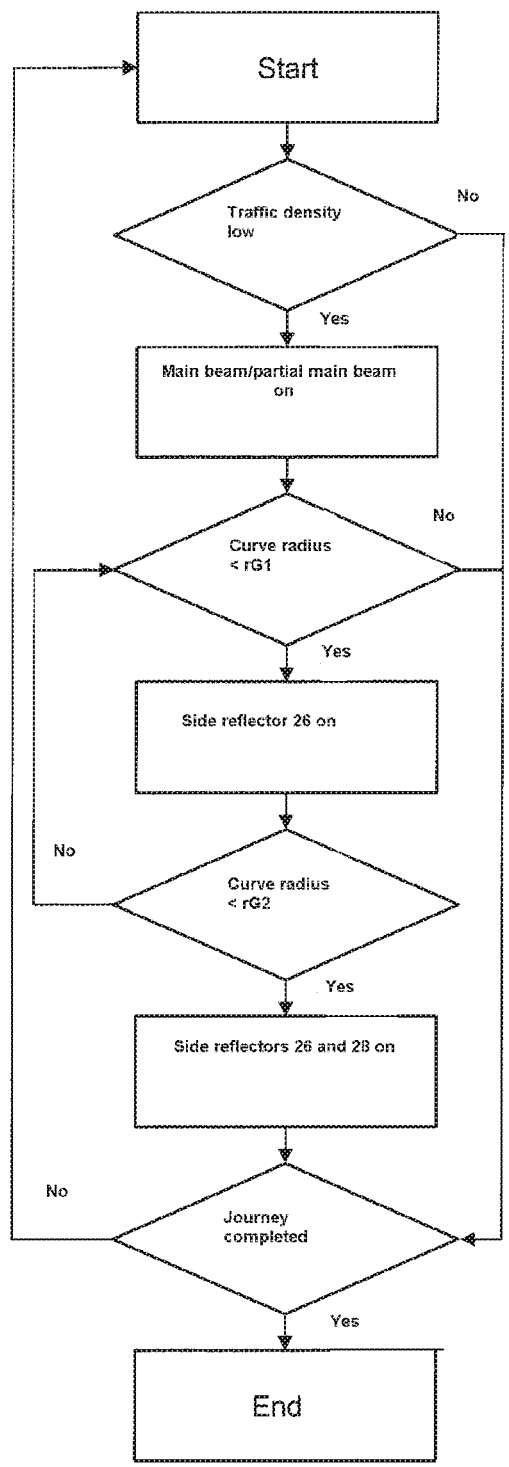
FIG. 3 shows a flow diagram of the method described herein.

FIG. 3 shows a flow diagram of the method which is described here. After a start of the method, firstly the traffic density is checked. If the traffic density is low enough, a main beam or a partial main beam is activated. The decision as to whether a main beam or a partial main beam of activated can depend, for example, on the road type. Furthermore, the question as to whether a partial main beam or a main beam is activated can depend on the road traffic. In the case of correspondingly heavy road traffic, instead of an entire main beam, a partial main beam can be activated. In a next step, the curve radius of a bend which is lying ahead is checked. If the curve radius is smaller than a threshold radius rG1, the first side reflector segment 26 is activated. If the curve radius is, furthermore, smaller than a threshold angle rG2, wherein rG2 is smaller than rG1, in addition to the first side reflector, the second side reflector is activated. The checking of the curve radii takes place continuously. As soon as the curve radii alter, the side reflectors 26 and 28 are turned off and on as required. After completion of the journey, the method is terminated.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A method for operating a headlight of a motor vehicle comprising:
   determining a road course for a road on which the motor vehicle is traveling;
   selecting a mode of operation for the headlight as a function of the road course, wherein the mode of operation is selected from the group consisting of a main beam mode and a partial beam mode;
   operating the headlight in the selected mode of operation such that a light distribution of a main beam of the headlight is adapted to the road course;
   adapting the light distribution in a first stage and in a second stage; and
   activating a first side reflector in the first stage and activating the first side reflector and a second side reflector in the second stage.

2. The method according to claim 1, further comprising altering the light distribution of the main beam as a function of a curve lying ahead such that the light distribution is widened in the direction of the inside of the bend.

3. The method according to claim 2, wherein the light distribution is altered such that the light distribution is narrowed towards the outside of the bend.

4. The method according to claim 1, wherein the first stage is activated in the case of bends with a curve radius smaller with respect to a first threshold radius, and wherein the second stage is activated in the case of bends with a curve radius smaller with respect to a second threshold radius which is smaller than the first threshold radius.

5. The method according to claim 1, further comprising deactivating the main beam mode when determining when a traffic density adjacent the vehicle is greater than a threshold traffic density.

6. The method according to claim 1, wherein the headlight is not pivoted when the headlight is operated in the selected mode.

7. The method according to claim 1, wherein the headlight is selected from the group consisting of a matrix headlight, a pixel headlight, a laser headlight and a combination thereof.

8. The method according to claim 1, further comprising determining a road course with the aid of a camera.

9. The method according to claim 1, further comprising determining a road course by means of map data.

10. A motor vehicle headlight assembly for a motor vehicle comprising:
   a fixed headlight having a main beam operable to emit a light distribution therefrom, a first side reflector configured to provide lateral illumination and a second side reflector configured to provide additional lateral illumination; and
   a controller configured to:
      adapt the light distribution of the main beam as a function of a road course of a road on which the motor vehicle is traveling;
      adapt the light distribution in a first stage and in a second stage;
      activate the first side reflector in the first stage; and
      activate the first side reflector and the second side reflector in the second stage.

11. The motor vehicle headlight assembly according to claim 10, further comprising a camera system aligned in a direction of travel of the motor vehicle and operably coupled to the controller for indicating the road course.

12. The motor vehicle headlight according to claim 11, further comprising map data indicating the road course, wherein the controller is configured to receive the map data.

13. The motor vehicle headlight according to claim 10, further comprising map data indicating the road course, wherein the controller is configured to receive the map data.

14. The motor vehicle headlight according to one of claim 10, wherein the controller is configured to receive traffic density data for road on which the motor vehicle is traveling and adapt the light distribution as a function of the traffic density data.

15. The motor vehicle headlight according to claim 10, wherein the headlight is selected from the group consisting of a matrix headlight, a pixel headlight, a laser headlight and a combination thereof.

16. A method for operating a headlight of a motor vehicle comprising:
   determining a road course for a road on which the motor vehicle is traveling;
   selecting a mode of operation for the headlight as a function of the road course, wherein the mode of operation includes a main beam mode and a partial beam mode;
   operating the headlight in the selected mode of operation such that a light distribution of the headlight is adapted to the road course;
   altering the light distribution in a first stage wherein a first side reflector adapted to provide lateral illumination is activated; and
   alerting the light distribution in a second stage wherein the first side reflector and a second side reflector adapted to provide additional lateral illumination are both activated.

* * * * *